US008174754B2

(12) United States Patent
Lee et al.

(10) Patent No.: US 8,174,754 B2

(45) Date of Patent: *May 8, 2012

(54) DISPLAY METHOD APPLIED TO ELECTROPHORETIC DISPLAY

(75) Inventors: Cheng-Hao Lee, Hsinchu (TW); Hsin-Chung Chen, Hsinchu (TW); Jen-Yu Chang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 819 days.

This patent is subject to a terminal disclaimer.

(21) Appl. No.: 12/236,281

(22) Filed: Sep. 23, 2008

(65) Prior Publication Data

US 2010/0073277 A1 Mar. 25, 2010

(30) Foreign Application Priority Data

Jul. 30, 2008 (TW) ............................... 97128819 A

(51) Int. Cl.
*G02B 26/00* (2006.01)

(52) U.S. Cl. ........ 359/296; 359/237; 359/238; 359/290; 345/107

(58) Field of Classification Search .................... 345/55, 345/84, 107, 204, 205, 690; 359/237, 290, 359/296

See application file for complete search history.

(56) References Cited

U.S. PATENT DOCUMENTS

| | | | | |
|---|---|---|---|---|
| 6,961,047 | B2 | 11/2005 | Katase | |
| 7,019,889 | B2 | 3/2006 | Katase | |
| 7,545,559 | B1 * | 6/2009 | Lee et al. | 359/296 |
| 2007/0139358 | A1 * | 6/2007 | Sakamoto | 345/107 |
| 2010/0020064 | A1 * | 1/2010 | Roosendaal et al. | 345/214 |

FOREIGN PATENT DOCUMENTS

WO WO 2008029356 A1 * 3/2008

* cited by examiner

*Primary Examiner* — My-Chau T Tran

(74) *Attorney, Agent, or Firm* — Chun-Ming Shih

(57) ABSTRACT

An electrophoretic display includes a plurality of pixels. A display method applied to the electrophoretic display includes the following steps. Firstly, a first frame is displayed on the pixels at a first time. Next, a difference amount between the pixels at the first time and the pixels at a second time predetermined for displaying a second frame is calculated. The second time is later than the first time. Next, whether the difference amount is larger than a predetermined value is determined. Next, corresponding part of the second frame is displayed on part of the pixels corresponding to the difference amount at the second time if the difference amount is not larger than the predetermined value.

10 Claims, 9 Drawing Sheets

DISPLAY METHOD APPLIED TO ELECTROPHORETIC DISPLAY

BACKGROUND

1. Field of the Invention

The present invention relates to a display method, and more particularly to a display method applied to an electrophoretic display.

2. Description of the Related Art

FIG. 1 is a schematic cross-sectional view of a conventional electrophoretic display. FIG. 2 is a flow chart of a conventional display method applied to the electrophoretic display of FIG. 1. FIG. 3A is a schematic view of a first frame displayed by the eletrophoretic display of FIG. 1 at a first time. FIG. 3B is a schematic view of a second frame displayed by the electrophoretic display of FIG. 1 at a second time. Referring to FIG. 1, the electrophoretic display 100 includes a plurality of pixels 110 adapted to displaying frames. The electrophoretic display 100 has an electrophoretic layer 120 which includes a plurality of microcapsules 122 and the electrophoretic fluid 124 filling in each of the microcapsules 122. The electrophoretic fluid 124 filling in each of the microcapsules 122 includes the dielectric solvent 124*a* and a plurality of charged pigment particles 124*b* dispersed in the dielectric solvent 123*a*.

The conventional display method applied to the electrophoretic display includes the following steps. Firstly, referring to FIGS. 1, 2 and 3A, the step 101 is performed. The step 101 is that a first frame F11 is displayed on the pixels 110 at a first time. Then, referring to FIGS. 1, 2 and 3B, the step 102 is performed. The step 102 is that a second frame F12 is displayed on the pixels 110 at a second time later than the first time. When the electrophoretic display 100 displays the first frame F11 or the second frame F12, part of the of the charged pigment particles 124*b* in each of the microcapsules 122 move to a side of the electrophoretic display 100 such that the first frame F11 or the second frame F12 is displayed.

However, the dielectric solvent 124*a* is viscous so as to limit the moving speed of the charged pigment particles 124*b*. Thus, when the step 101 and the step 102 are performed according to the conventional display method applied to the electrophoretic display, a ghost image (the diagonal lines as shown in FIG. 3B) of the first frame F11 appears at the second frame F12 displayed by the electrophoretic display 100.

To solve the above problem, another conventional display method applied to the electrophoretic display is provided. FIG. 4 is a flow chart of another conventional display method applied to the electrophoretic display of FIG. 1. FIG. 5A is a schematic view of a first frame displayed by the electrophoretic display of FIG. 1 at a first time. FIG. 5B is a schematic view of a black frame displayed by the electrophoretic display of FIG. 1 at a second time. FIG. 5C is a schematic view of a white frame displayed by the electrophoretic display of FIG. 1 at a third time. FIG. 5D is a schematic view of a second frame displayed by the electrophoretic display of FIG. 1 at a fourth time. Another conventional display method applied to the electrophoretic display includes the following steps. Firstly, referring to FIGS. 1, 4 and 5A, the step 201 is performed. The step 201 is that a first frame F21 is displayed on the pixels 110 at a first time. Then, referring to FIGS. 1, 4 and 5B, the step 202 is performed. The step 202 is that a black frame F22 is displayed on the pixels 110 at a second time later than the first time. Next, referring to FIGS. 1, 4 and 5C, the step 203 is performed. The step 203 is that a white frame F23 is displayed on the pixels 110 at a third time later than the second time. Finally, referring to FIGS. 1, 4 and 5D, the step 204 is performed. The step 204 is that a second frame F24 is displayed on the pixels 110 at a fourth time later than the third time. However, according to another conventional display method applied to the electrophoretic display the above four steps must be performed in order to switch the first frame F21 to the second frame F22, so the speed for switching frames is relatively low and the electrophoretic display 100 consumes more power.

BRIEF SUMMARY

The present invention is directed to provide a display method applied to an electrophoretic display which can improve the speeding for switching frames and reduce the power consumption of the electrophoretic display.

A display method applied to an electrophoretic display in accordance with an embodiment of the present invention is provided. The electrophoretic display includes a plurality of pixels. The display method includes the following steps. Firstly, a first frame is displayed on the pixels at a first time. Next, a difference amount between the pixels at the first time and the pixels at a second time predetermined for displaying a second frame is calculated. The second time is later than the first time. Next, whether the difference amount is larger than a predetermined value is determined. Next, corresponding part of the second frame is displayed on part of the pixels corresponding to the difference amount at the second time if the difference amount is not larger than the predetermined value.

In an embodiment of the present invention, the predetermined value is 25 percent of the amount of the pixels.

In an embodiment of the present invention, the display method applied to the electrophoretic display further includes the following steps. Next, the first frame is cleared between the first time and the second time if the difference amount is larger than the predetermined value. Next, the second frame is displayed on the pixels at the second time. In addition, the step of clearing the first frame between the first time and the second time includes the following procedures. Firstly, a first single-color frame is displayed on the pixels at a third time. The third time is between the first time and the second time. Next, a second single-color frame is displayed on the pixels at a fourth time. The fourth time is between the third time and the second time. In addition, the first single-color frame is a black frame or a white frame, the second single-color frame is a black frame or a white frame, and the color of the first single-color frame is different from that of the second single-color frame.

In an embodiment of the present invention, before displaying corresponding part of the second frame on part of the pixels corresponding to the difference amount at the second time, the display method applied to the electrophoretic display further includes the following step. Corresponding part of the first frame displayed on part of the pixels corresponding to the difference amount is cleared between the first time and the second time. In addition, the step of clearing corresponding part of the first frame displayed on part of the pixels corresponding to the difference amount between the first time and the second time includes the following procedures. Firstly, a first single-color image is displayed on part of the pixels corresponding to the difference amount at a third time. The third time is between the first time and the second time. A second single-color image is displayed on part of the pixels corresponding to the difference amount at a fourth time. The fourth time is between the third time and the second time. In addition, the first single-color image is a black image or a white image, the second single-color image is a black image or a white image, and the color of the first single-color image is different from that of the second single-color image.

If the difference amount between the pixels at the first time for displaying the first frame and the pixels at the second time predetermined for displaying the second frame is not larger than the predetermined value, corresponding part of the second frame is displayed on part of the pixels corresponding to the difference amount at the second time. In other words, if the different amount is not larger than the predetermined value, only part of the second frame is updated. Therefore, compared with the conventional arts, the display method applied to the electrophoretic display of the embodiment can improve effectively the speed for switching frames and reduce the power consumption of the electrophoretic display.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present display method, in detail. The following description is given by way of example, and not limitation.

Figure 1:
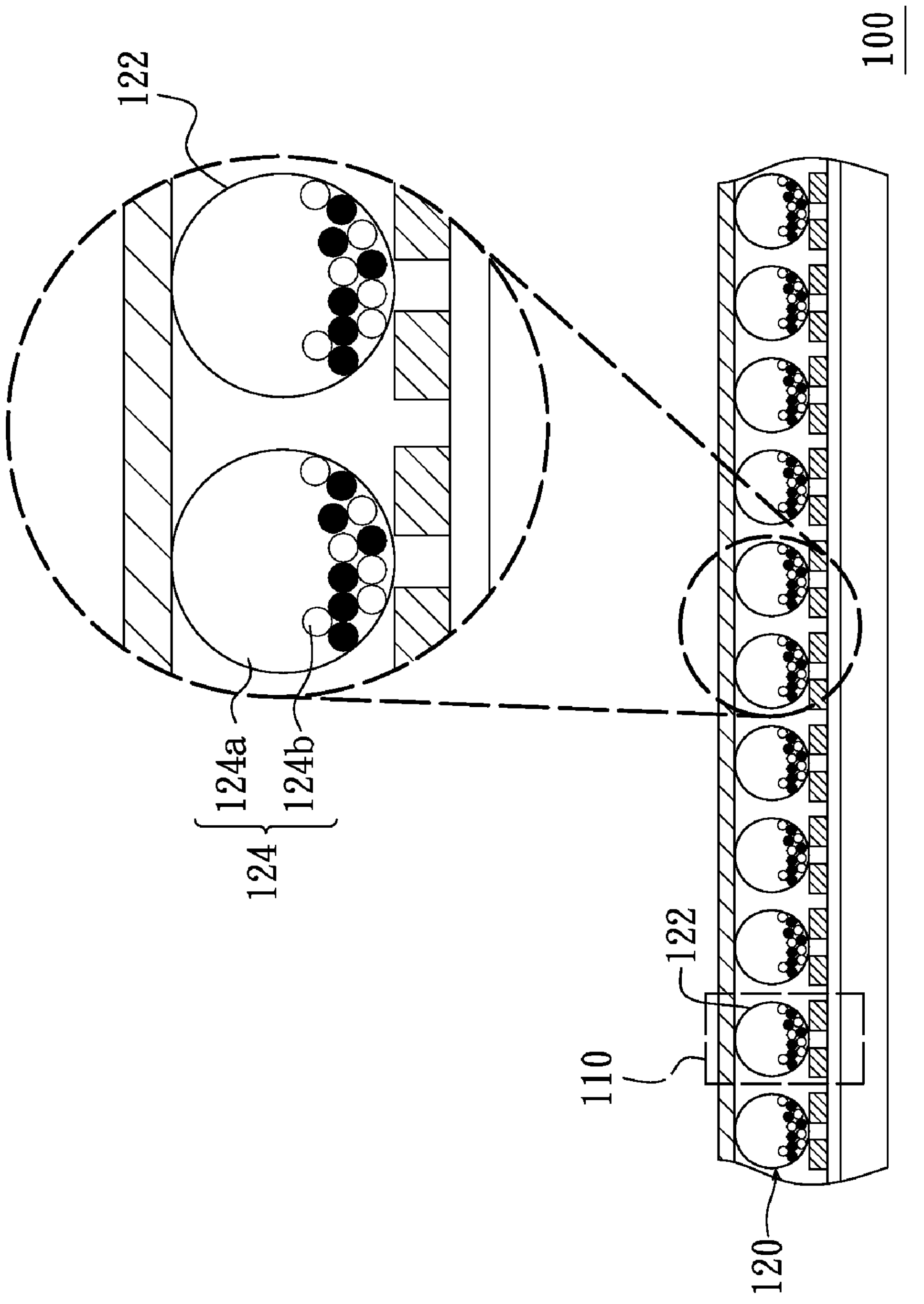
FIG. 1 (Prior Art)
FIG. 1 is a schematic cross-sectional view of a conventional electrophoretic display.
Figure 2:
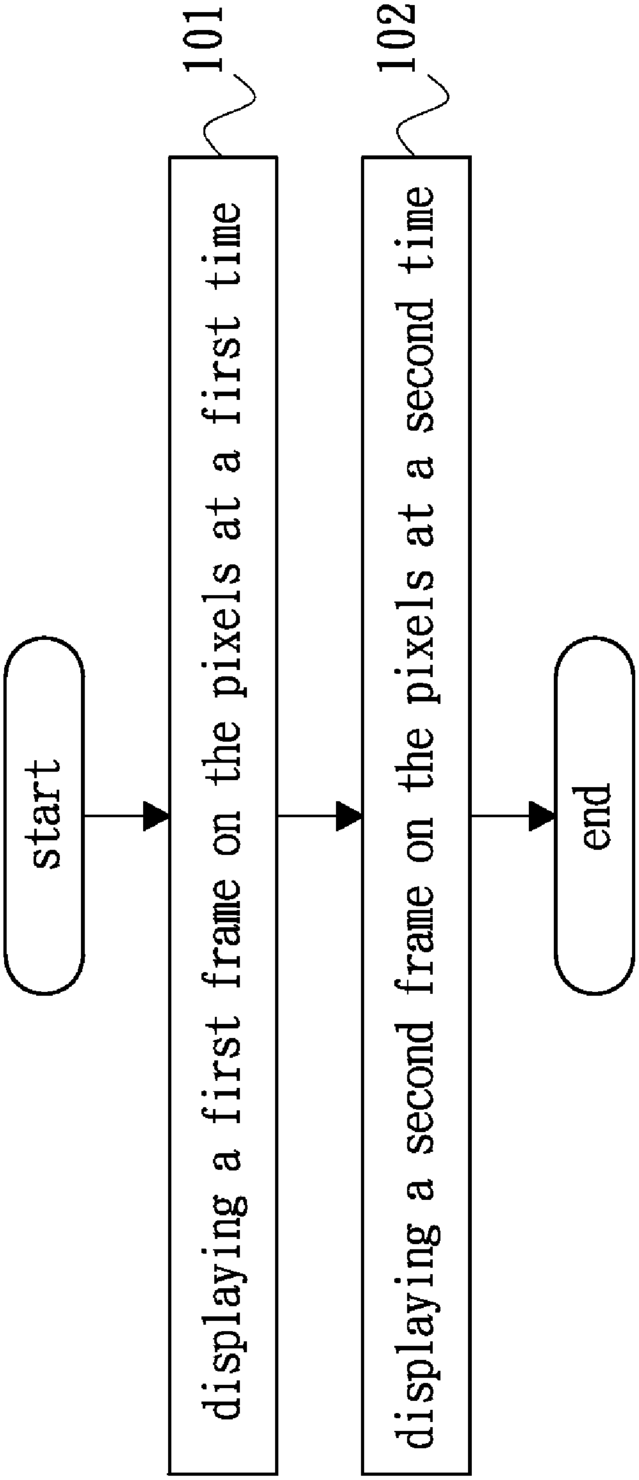
FIG. 2 (Prior Art)
FIG. 2 is a flow chart of a conventional display method applied to the electrophoretic display of FIG. 1.
Figure 3A:
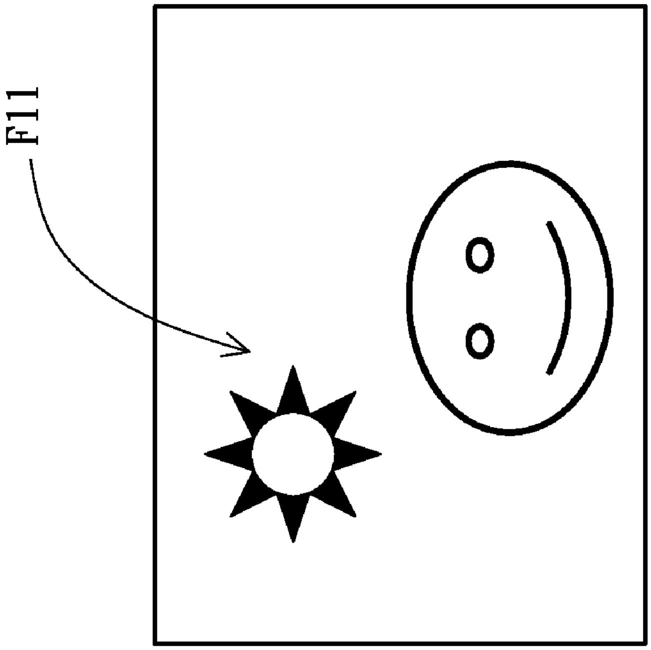
FIG. 3A (Prior Art)
FIG. 3A is a schematic view of a first frame displayed by the electrophoretic display of FIG. 1 at a first time.
Figure 3B:
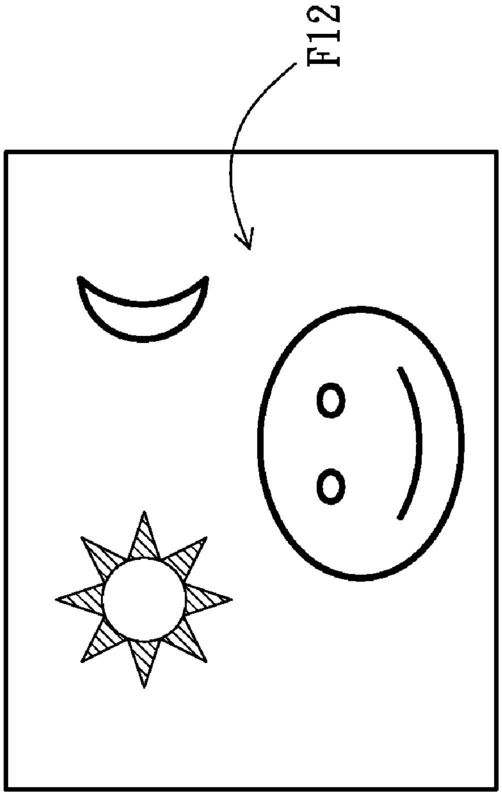
FIG. 3B (Prior Art)
FIG. 3B is a schematic view of a second frame displayed by the electrophoretic display of FIG. 1 at a second time.
Figure 4:
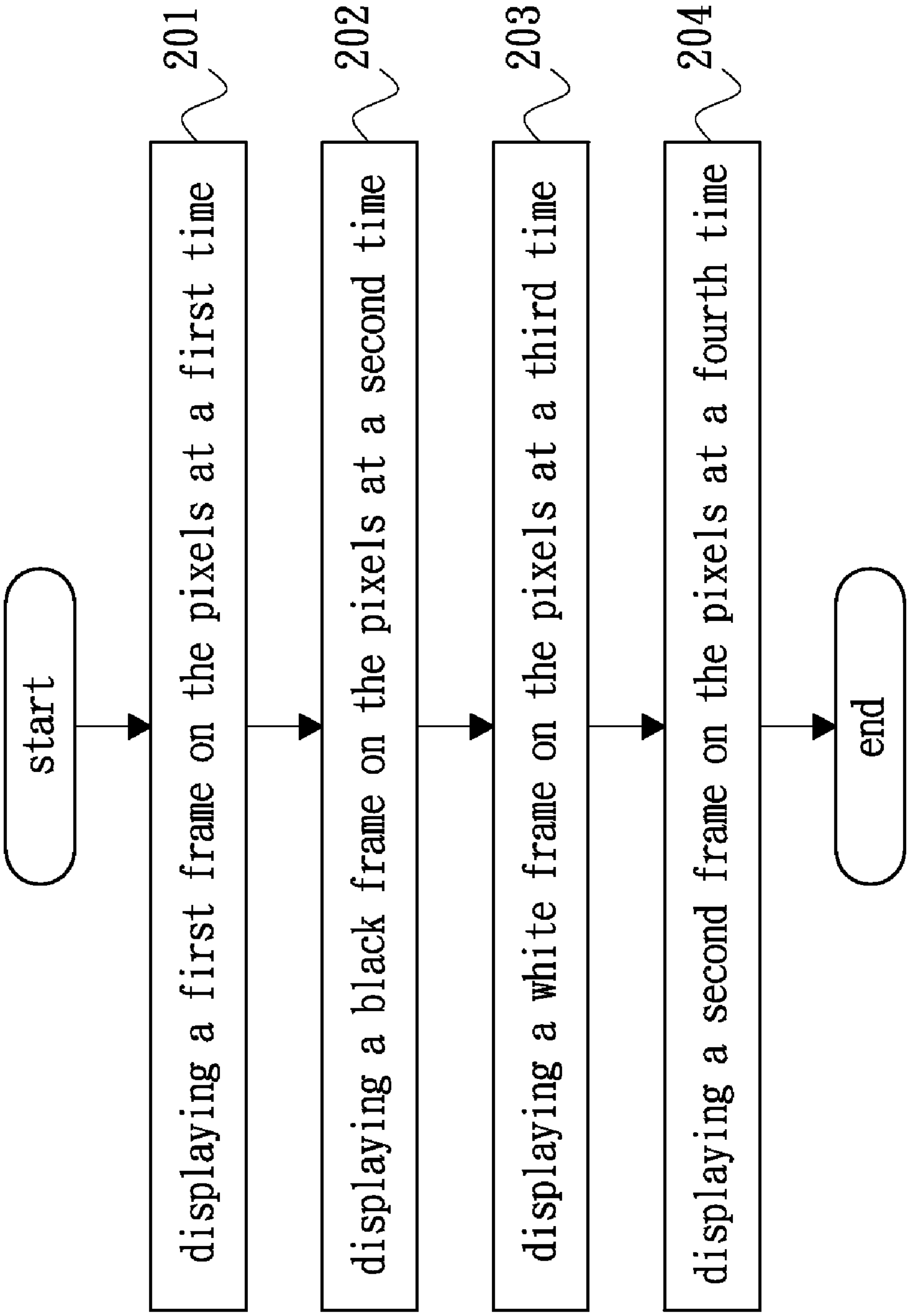
FIG. 4 (Prior Art)
FIG. 4 is a flow chart of another conventional display method applied to the electrophoretic display of FIG. 1.
Figure 5A:
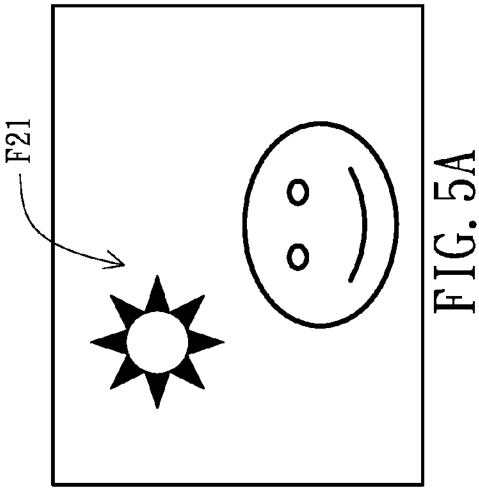
FIG. 5A (Prior Art)
FIG. 5A is a schematic view of a first frame displayed by the electrophoretic display of FIG. 1 at a first time.
Figure 5B:
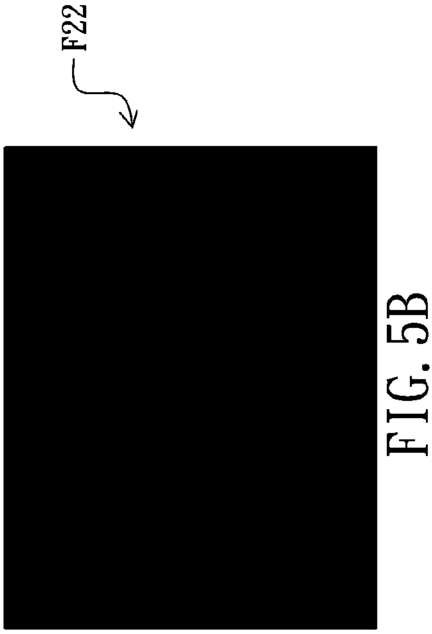
FIG. 5B (Prior Art)
FIG. 5B is a schematic view of a black frame displayed by the electrophoretic display of FIG. 1 at a second time.
Figure 5C:
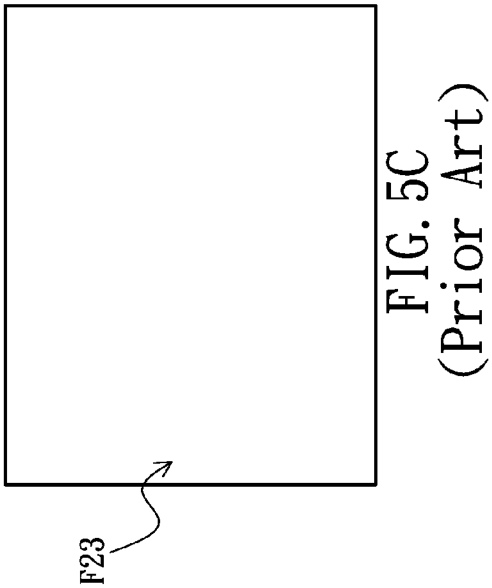
FIG. 5C (Prior Art)
FIG. 5C is a schematic view of a white frame displayed by the electrophoretic display of FIG. 1 at a third time.
Figure 5D:
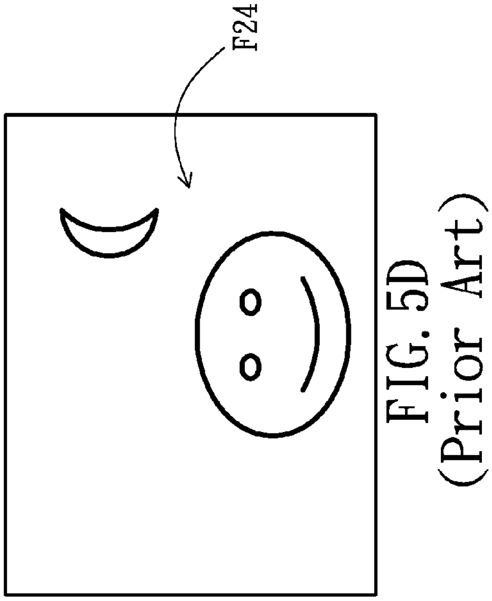
FIG. 5D (Prior Art)
FIG. 5D is a schematic view of a second frame displayed by the electrophoretic display of FIG. 1 at a fourth time.
Figure 6:
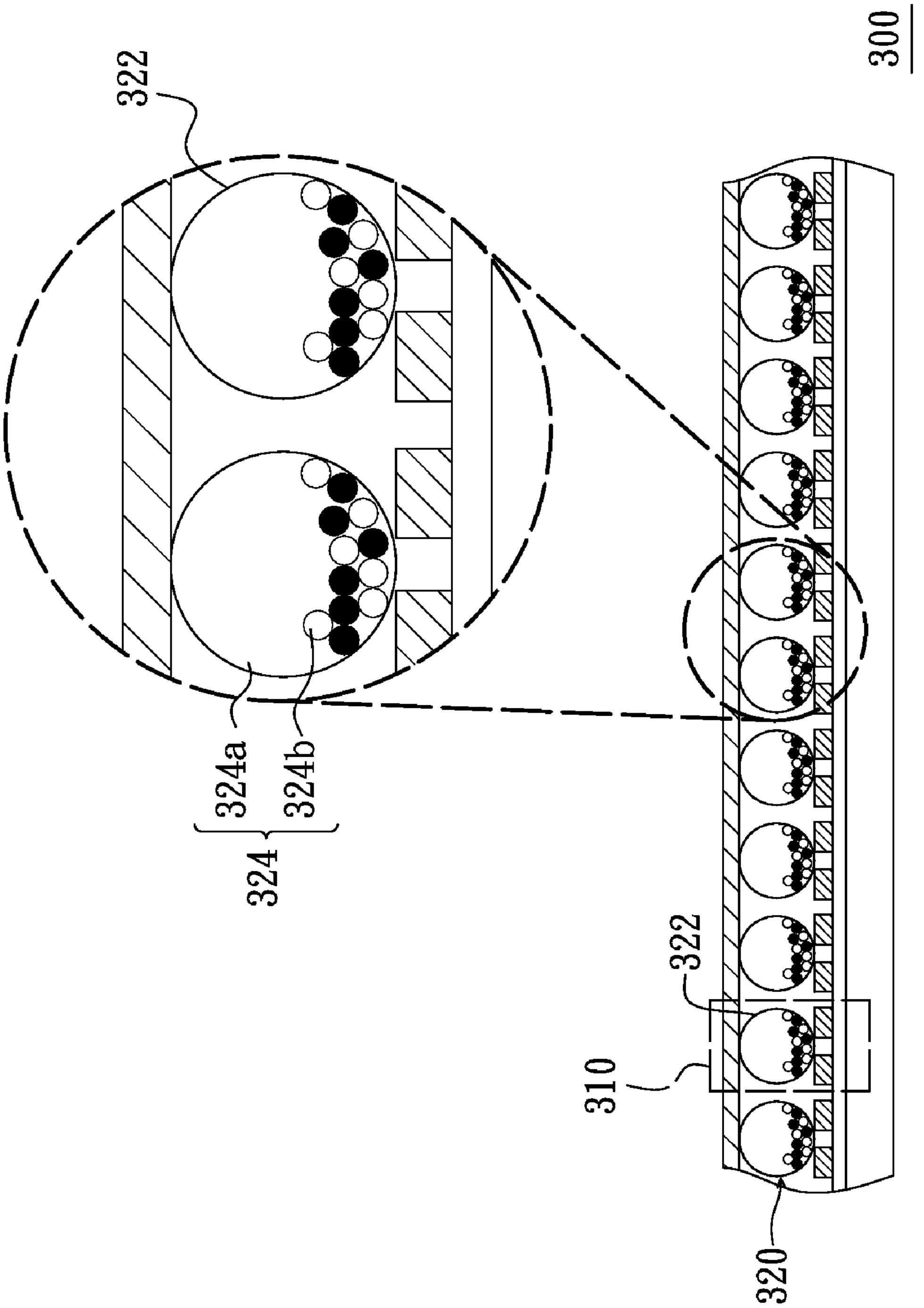
FIG. 6 is a schematic cross-sectional view of an electrophoretic display in accordance with an embodiment of the present invention.
Figure 7:
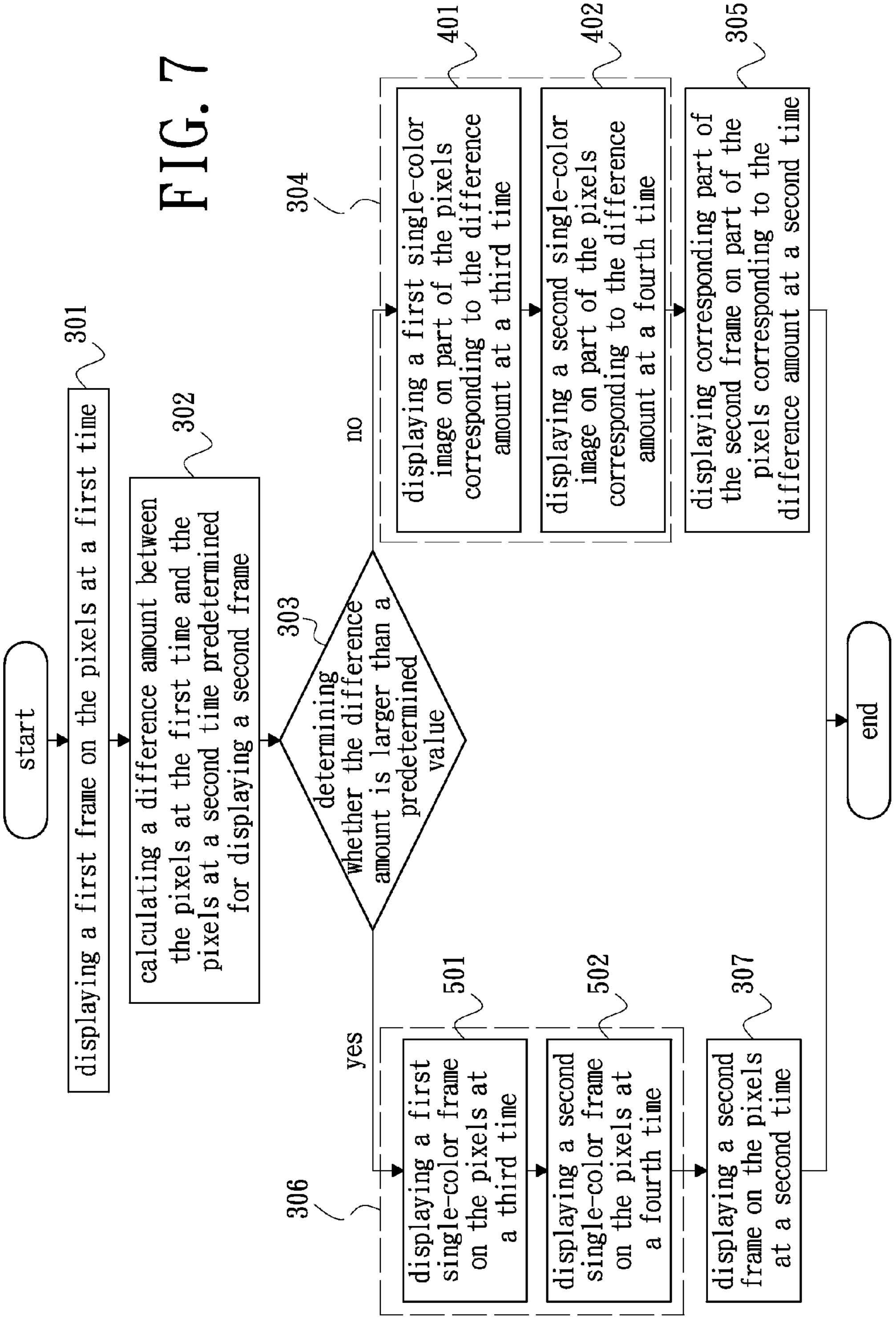
FIG. 7 is a flow chart of a display method applied to the electrophoretic display of FIG. 6 in accordance with the embodiment.
Figure 8A:
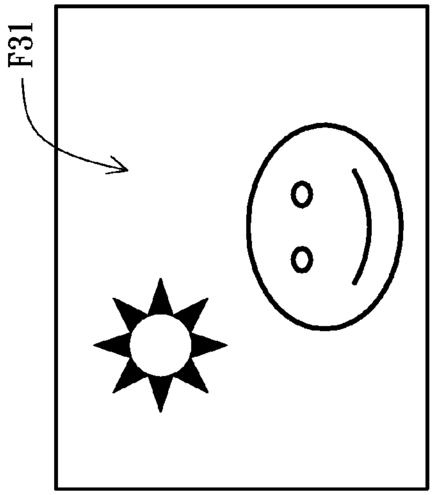
FIG. 8A is a schematic view of a first frame displayed by the electrophoretic display of FIG. 6 at a first time.
Figure 8B:
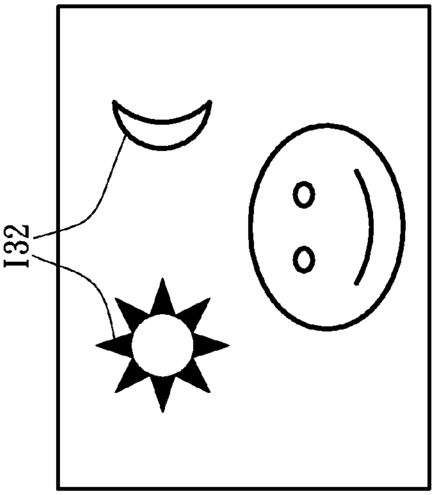
FIG. 8B is a schematic view of a first single-color image displayed by the electrophoretic display of FIG. 6 at a third time.
Figure 8C:
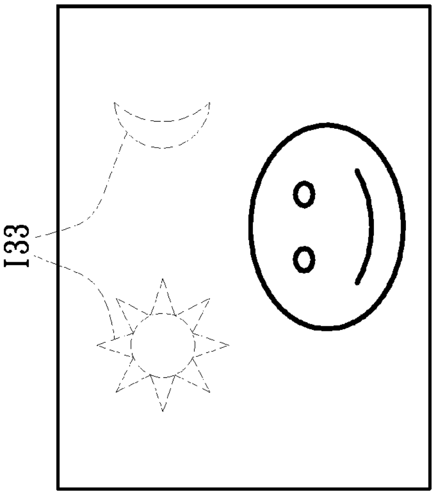
FIG. 8C is a schematic view of a second single-color image displayed by the electrophoretic display of FIG. 6 at a fourth time.
Figure 8D:
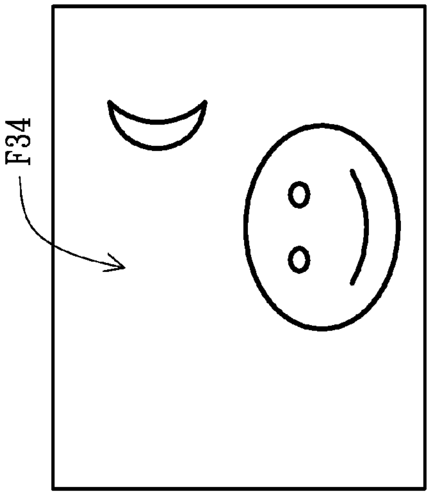
FIG. 8D is a schematic view of a second frame displayed by the electrophoretic display of FIG. 6 at a second time.
Figure 9A:
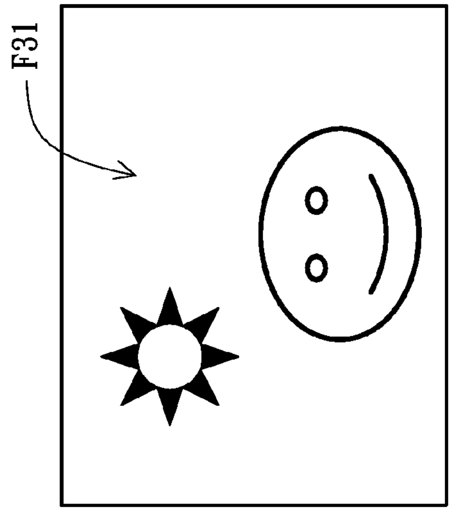
FIG. 9A is a schematic view of the first frame displayed by the electrophoretic display of FIG. 6 at the first time.
Figure 9B:
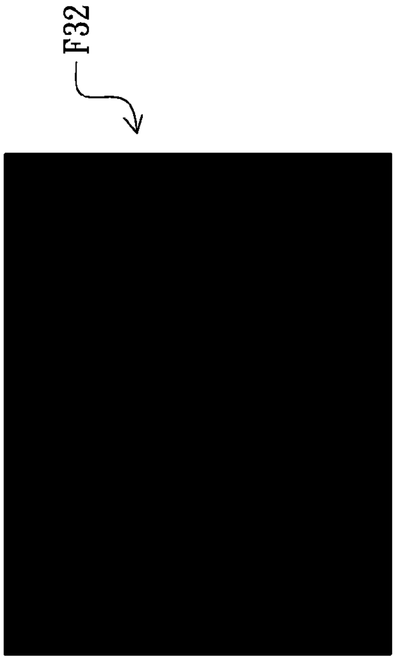
FIG. 9B is a schematic view of a first single-color frame displayed by the electrophoretic display of FIG. 6 at the third time.
Figure 9C:
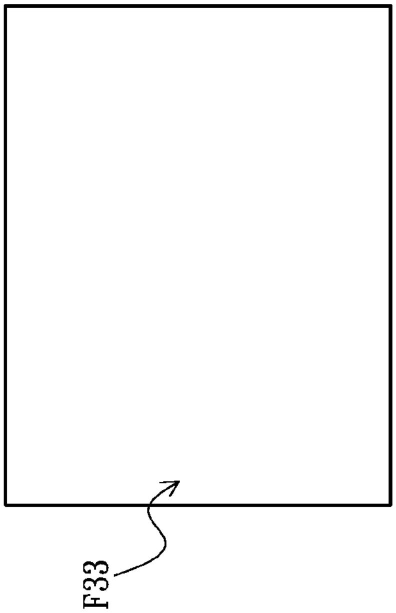
FIG. 9C is a schematic view of a second single-color frame displayed by the electrophoretic display of FIG. 6 at the fourth time.
Figure 9D:
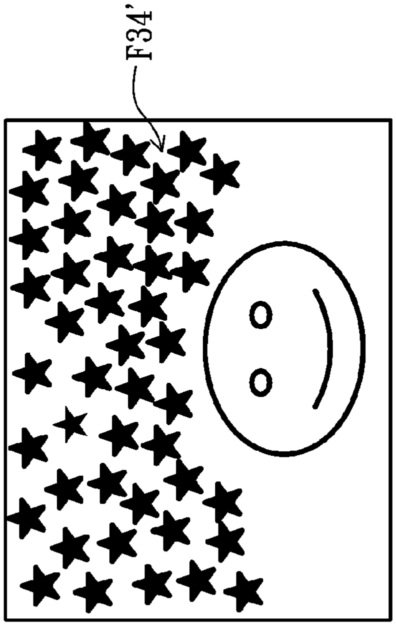
FIG. 9D is a schematic view of another second frame displayed by the electrophoretic display of FIG. 6 at the second time.

FIG. 6 is a schematic cross-sectional view of an electrophoretic display in accordance with an embodiment of the present invention. FIG. 7 is a flow chart of a display method applied to the electrophoretic display of FIG. 6 in accordance with the embodiment. FIG. 8A is a schematic view of a first frame displayed by the electrophoretic display of FIG. 6 at a first time. FIG. 8B is a schematic view of a first single-color image displayed by the electrophoretic display of FIG. 6 at a third time. FIG. 8C is a schematic view of a second single-color image displayed by the electrophoretic display of FIG. 6 at a fourth time. FIG. 8D is a schematic view of a second frame displayed by the electrophoretic display of FIG. 6 at a second time. FIG. 9A is a schematic view of the first frame displayed by the electrophoretic display of FIG. 6 at the first time. FIG. 9B is a schematic view of a first single-color frame displayed by the electrophoretic display of FIG. 6 at the third time. FIG. 9C is a schematic view of a second single-color frame displayed by the electrophoretic display of FIG. 6 at the fourth time. FIG. 9D is a schematic view of another second frame displayed by the electrophoretic display of FIG. 6 at the second time.

Referring to FIG. 6, the electrophoretic display 300 includes a plurality of pixels 310 adapted to displaying frames. The electrophoretic display 300 includes an electrophoretic layer 320 having a plurality of microcapsules 322 and electrophoretic fluid 324 filling in each of the microcapsules 322. The electrophoretic fluid 324 filling in each of the microcapsules 322 includes the dielectric solvent 324*a* and a plurality of charged pigment particles 324*b* dispersed in the dielectric solvent 324*a*. It should be noted that the microcapsules 322 of the present embodiment may be replaced by a plurality of microcups. Furthermore, one side of each of the charged pigment particles 213*d* may be white and another side thereof may be black. The scope of the present invention is not limited herein.

The display method applied to the electrophoretic display of the present embodiment includes following steps. Firstly, referring to FIGS. 6, 7 and 8A, the step 301 is performed. The step 301 is that a first frame F31 is displayed on the pixels 310 at a first time. Next, referring to FIGS. 6 and 7, the step 302 is performed. The step 302 is that a difference amount between the pixels 310 at the first time and the pixels 310 at a second time predetermined for displaying a second frame F34 (as shown in FIG. 8D) is calculated. The second time is later than the first time. Next, referring to FIGS. 6 and 7, the step 303 is performed. The step 303 is that whether the difference amount is larger than a predetermined value is determined. In the embodiment, the predetermined value may be 25 percent of the amount of the pixels 310.

Next, referring to FIGS. 6, 7, 8B and 8C, if the difference amount is not larger than the predetermined value, the step 304 is performed. The step 304 is that corresponding part of the first frame F31 displayed on part of the pixels 310 corresponding to the difference amount is cleared between the first time and the second time. In specific, the step 304 includes the following procedures. Firstly, referring to FIGS. 6, 7 and 8B, the procedure 401 is performed. The procedure 401 is that a first single-color image 132, such as a black image, is displayed on part of the pixels 310 corresponding to the difference amount at a third time. At the same time, the rest part of the first frame F31 including the smile-face image of FIG. 8A is still displayed on the rest pixels 310 not corresponding to the difference amount. In addition, the third time is between the first time and the second time. Next, referring to FIGS. 6, 7 and 8C, the procedure 402 is performed. The procedure 402 is that a second single-color image 133 (shown as the dotted lines), such as a white image, is displayed on part of the pixels 310 corresponding to the difference amount at a fourth time. At the same time, the rest part of the first frame F31 including the smile-face image of FIG. 8A is still displayed on the rest pixels not corresponding to the difference amount. Furthermore, the fourth time is between the third time and the second time. In another embodiment, the first single-color image 132 may be a white image and the second single-color image 133 may be a black image according to the requirement of the designer.

Thereafter, referring to FIGS. 6, 7 and 8D, the step 305 is performed. The step 305 is that corresponding part of the second frame F34 (including the moon image) is displayed on part of the pixels 310 corresponding to the difference amount at the second time. Thus the whole second frame F34 is displayed. It should to be noted that, in the display method applied to the electrophoretic display of another embodiment of the present invention, the step 304 may be omitted and the step 305 is directly performed after the step 303 is performed according to the requirement of the designer.

If the difference amount between the pixels 310 at the first time for displaying the first frame F31 and the pixels at the second time predetermined for displaying the second frame F34 is not larger than the predetermined value, corresponding part of the second frame F34 is displayed on part of the pixels 310 corresponding to the difference amount at the second time. In other words, if the difference amount is not larger than the predetermined value, only part of the second frame F34 is updated. Therefore, compared with the conventional arts, the display method applied to the electrophoretic display of the embodiment can improve effectively the speed for switching images and reduce the power consumption of the electrophoretic display 200.

It should be noted that, in the display method applied to the electrophoretic display of the embodiment, the following steps in another condition are performed. Firstly, referring to FIGS. 6, 7 and 9A, the step 301 is performed. The step 301 is that the first frame F31 is displayed on the pixels 310 at the first time. Next, referring to FIGS. 6 and 7, the step 302 is performed. The step 302 is that the difference amount between the pixels 310 at the first time and the pixels 310 at the second time predetermined for displaying another second frame F34' (as shown in FIG. 9D) is calculated. The second time is later than the first time. Next, referring to FIGS. 6 and 7, the step 303 is performed. The step 303 is that whether the difference amount is larger than a predetermined value is determined.

Next, referring to FIGS. 6, 7, 9B and 9C, if the difference amount is larger than the predetermined value, the step 306 is performed. The step 306 is that the first frame F31 is cleared between the first time and the second time. In specific, the step 306 includes the following procedures. Firstly, referring to FIGS. 6, 7 and 9B, the procedure 501 is performed. The procedure 501 is that a first single-color frame F32, such as a black frame, is displayed on the pixels 310 at the third time. The third time is between the first time and the second time. Next, referring to FIGS. 6, 7 and 9C, the procedure 502 is performed. The procedure 502 is that a second single-color frame F33, such as a white frame, is displayed on the pixels 310 at the fourth time. The fourth time is between the third time and the second time. In another embodiment, the first single-color frame F32 may be a white frame and the second single-color frame F33 may be a black frame according to the requirement of the designer.

Thereafter, referring to FIGS. 6, 7 and 9D, the step 307 is performed. The step 307 is that another second frame F34' is displayed on the pixels 310 at the second time.

According to the mentioned above, the display method applied to the electrophoretic display of the embodiment of the present invention at least has one of the following advantages or other advantages. If the difference amount between the pixels at the first time for displaying the first frame and the pixels at the second time predetermined for displaying the second frame is not larger than the predetermined value, corresponding part of the second frame is displayed on part of the pixels corresponding to the difference amount at the second time. In other words, if the different amount is not larger than the predetermined value, only the part of the second frame is updated. Therefore, compared with the conventional arts, the display method applied to the electrophoretic display of the embodiment can improve effectively the speed for switching frames and reduce the power consumption of the electrophoretic display.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display method applied to an electrophoretic display, wherein the electrophoretic display has a plurality of pixels, the method comprising:

displaying a first frame on the pixels at a first time;

calculating a difference amount between the pixels at the first time and the pixels at a second time predetermined for displaying a second frame, wherein the second time is later than the first time;

determining whether the difference amount is larger than a predetermined value; and displaying corresponding part of the second frame on part of the pixels corresponding to the difference amount at the second time if the difference amount is not larger than the predetermined value.

2. The display method applied to the electrophoretic display as claimed in claim 1, wherein the predetermined value is 25 percent of the amount of the pixels.

3. The display method applied to the electrophoretic display as claimed in claim 1, further comprising:

clearing the first frame between the first time and the second time if the difference amount is larger than the predetermined value; and displaying the second frame on the pixels at the second time.

4. The display method applied to the electrophoretic display as claimed in claim 3, wherein the step of clearing the first frame between the first time and the second time comprises:

displaying a first single-color frame on the pixels at a third time, wherein the third time is between the first time and the second time.

5. The display method applied to the electrophoretic display as claimed in claim 4, wherein the step of clearing the first frame between the first time and the second time further comprises:

displaying a second single-color frame on the pixels at a fourth time, wherein the fourth time is between the third time and the second time.

6. The display method as claimed in claim 5, wherein the first single-color frame is a black frame or a white frame, the second single-color frame is a black frame or a white frame, and the color of the first single-color frame is different from that of the second single-color frame.

7. The display method applied to the electrophoretic display as claimed in claim 1, before the step of displaying corresponding part of the second frame on part of the pixels corresponding to the difference amount at the second time, further comprising:

clearing corresponding part of the first frame displayed on part of the pixels corresponding to the difference amount between the first time and the second time.

8. The display method applied to the electrophoretic display as claimed in claim 7, wherein the step of clearing corresponding part of the first frame displayed on part of the pixels corresponding to the difference amount between the first time and the second time comprises:

displaying a first single-color image on part of the pixels corresponding to the difference amount at a third time, wherein the third time is between the first time and the second time.

9. The display method applied to the electrophoretic display as claimed in claim 8, wherein the step of clearing corresponding part of the first frame displayed on part of the pixels corresponding to the difference amount between the first time and the second time further comprises:

displaying a second single-color image on part of the pixels corresponding to the difference amount at a fourth time, wherein the fourth time is between the third time and the second time.

10. The display method applied to the electrophoretic display as claimed in claim 9, wherein the first single-color image is a black image or a white image, the second single-color image is a black image or a white image, and the color of the first single-color image is different from that of the second single-color image.

* * * * *